June 30, 1931. B. H. LUNDBORG Re. 18,114

FLUID FILTER

Original Filed Nov. 10, 1926

INVENTOR.
B. H. Lundborg
BY Marks & Clerk
ATTORNEYS.

Reissued June 30, 1931

Re. 18,114

UNITED STATES PATENT OFFICE

BROR HENNING LUNDBORG, OF STOCKHOLM, SWEDEN, ASSIGNOR TO SVENSKA ACKUMULATOR AKTIEBOLAGET JUNGNER, OF STOCKHOLM, SWEDEN, A CORPORATION

FLUID FILTER

Original No. 1,648,773, dated November 8, 1927, Serial No. 147,588, filed November 10, 1926, and in Sweden June 19, 1926. Application for reissue filed March 18, 1929. Serial No. 348,100.

The filters generally used in filtering benzole, oils and the like consist of a wire-net having a certain fixed size of the meshes. The said filters are very soon stopped up, and since, in order that the filter shall be effective, the size of the meshes must be extremely small, it is very difficult to effectively clean the same, and the common consequence is that the net is destroyed in order to let the fluid pass, and thus the filtering action get lost. Besides, if the filter has once been provided with a filter net having a certain size of the meshes it meets with a considerable trouble to exchange said net for another net more suitable for the new purpose.

The present invention comprises a filter, which can be easily cleaned by a simple dismounting and which can be made adjustable for differently fine filtering through a screw adjusting means.

According to the invention the filter consists of at least two bodies placed in a fluid conduit and having opposed parallel surfaces separated through a small space, said bodies being provided with mutually displaced channels communicating through said space and the channels of the one body being connected to the inlet and those of the other body to the outlet for the fluid.

According to one form of embodiment the filter consists of a housing having inlet and outlet openings and of a central body inserted or screwed into said housing and having grooves at the surface, said grooves being covered by members so that one or more narrow and, if desired, adjustable spaces are formed between the two bodies, said space being so narrow that it is capable of precluding the particles not desired.

Figure 1:
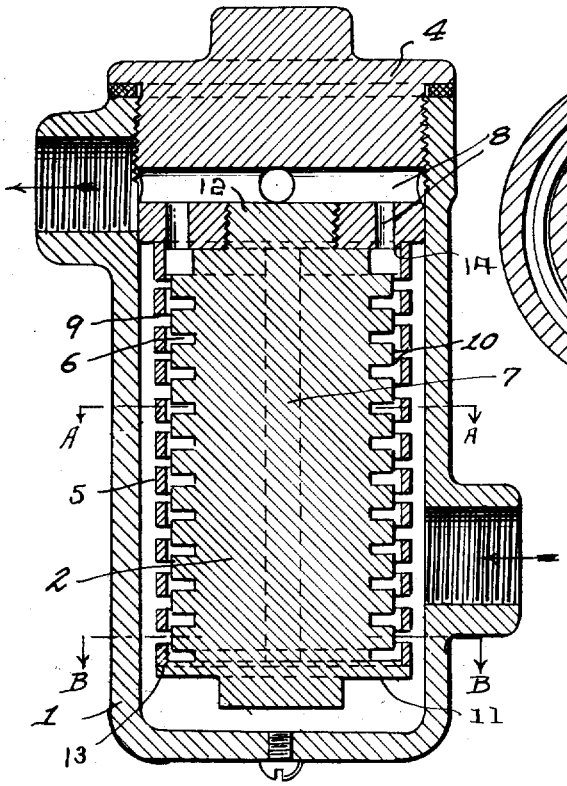
Figure 2:
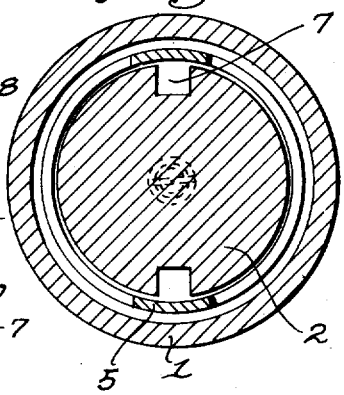
Figure 4:
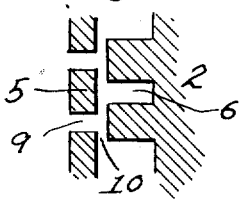
Figure 3:
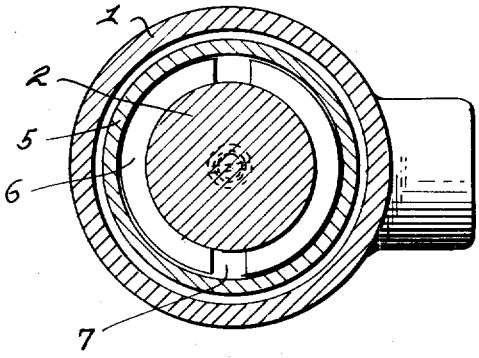
Figure 5:
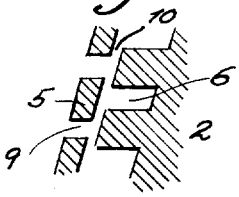

The annexed drawings illustrate a form of embodiment of the invention. Fig. 1 shows a longitudinal section, Fig. 2 shows a cross-section along the line B—B, and Fig. 3 shows a cross-section along the line A—A of Fig. 1. Figs. 4 and 5 show two different forms of embodiment of the space, the one having a cylindrical central body and the other a conical central body.

Inserted in the housing 1 is a central body 2 which may be conical or cylindrical and which is connected to the housing by means of the screw plug 4. Connected to the screw plug 4 is also a sleeve-shaped body 5. The central body 2 is provided with annular grooves 6 which open into two longitudinal slots 7 communicating with the outlet through bores 8 in the screw plug. The covering member 5 is in the present case provided with cut slots 9 except in front of the slots 7 in the central body which are entirely covered by said member.

If the central body 2 be made with a smaller outer diameter than the inner diameter of the member 5, there will be formed a certain space 10, Figs. 4 and 5, which permits the fluid to pass freely, but retains the solid dirt, the size of which exceeds the space 10.

The sleeve-shaped body 5 is held in place by being clamped between the annular flange 11 at the lower end of the central body 2 and the under side of the screw plug 4, the latter having a threaded engagement with the axial boss 12 at the upper end of the central body 2. Where the ends of the sleeve-shaped body 5 engage the flange 11 and the plug 4, the flange and plug are grooved concentrically with the axis of the central body 2 to provide mutual guide surfaces at the engagement of the respective ends of the sleeve-shaped body 5 with the flange 11 and the plug 4, as at 13 and 14.

If, as according to Fig. 5, the central body 2 be made conical and also the member 5 be made with the same conical shape and if the said bodies be made adjustable relatively to each other, the space 10 can be made larger or smaller, and thus it is obtained that one and the same filter can by a simple adjustment be used for different purposes.

The passing of the fluid through the filter is the following:

The fluid enters through the inlet in the direction of the arrow, passes through the space 10, formed due to the difference of the diameters of the central body 2 and the covering element 5, is collected in the annular channels 6, passes through the longitudinal channels 7 and up through the bores 8 to the outlet.

The form of embodiment above referred to is an example only and several other forms may be suggested.

What I claim is:

1. In a fluid filter, the combination of a housing closed at one end and a detachable covering member at the other end, the housing having an inlet and an outlet for the fluid to be filtered, said covering member having passages leading from the interior of the housing to the outlet thereof; with a core member detachably connected with the covering member, extending into the housing and spaced therefrom to form an annular chamber communicating with the inlet of the housing, and having a series of grooves extending around its periphery with a duct in its circumferential face intersecting the grooves and communicating with the passages through the covering member; and a sleeve-shaped filtering screen mounted in the annular chamber, including a series of bands spaced apart and respectively positioned opposite to the several grooves in close overlapping relation to the channel edges of the core member to preclude the passage of solid matter through the screen into the grooves.

2. In a fluid filter, the combination of a housing closed at one end and a detachable covering member at the other end, the housing having an inlet and an outlet for the fluid to be filtered, said covering member having passages leading from the interior of the housing to the outlet thereof; with a core member detachably connected with the covering member, extending into the housing and spaced therefrom to form an annular chamber communicating with the inlet of the housing, and having a series of peripheral grooves with a duct intersecting the grooves, said duct extending longitudinally of the circumferential wall of the core member and communicating with the passages through the covering member; and a sleeve-shaped filtering screen mounted in the annular chamber, including a series of bands spaced apart and an imperforate part connecting the bands and extending longitudinally of the screen, said bands being positioned opposite to the several grooves in close overlapping relation to the channel edges of the core member to preclude the passage of solid matter through the screen, and said imperforate part extending over the longitudinal duct of the core member to close the same to the annular chamber.

Signed at Stockholm, Sweden, this 8th day of February 1929.

BROR HENNING LUNDBORG.